June 3, 1952     F. D. BRADDON ET AL     2,598,672

MARINE GYRO VERTICAL

Filed Aug. 1, 1945     6 Sheets-Sheet 1

INVENTORS
FREDERICK D. BRADDON
LENNOX F. BEACH
LOREN J. DELANTY
VICTOR VACQUIER
BY
ATTORNEY.

June 3, 1952 — F. D. BRADDON ET AL — 2,598,672
MARINE GYRO VERTICAL
Filed Aug. 1, 1945 — 6 Sheets-Sheet 2

INVENTORS
FREDERICK D. BRADDON
LENNOX F. BEACH
LOREN J. DELANTY
VICTOR VACQUIER
BY
ATTORNEY.

June 3, 1952 F. D. BRADDON ET AL 2,598,672
MARINE GYRO VERTICAL
Filed Aug. 1, 1945 6 Sheets-Sheet 3

INVENTORS
FREDERICK D. BRADDON
LENNOX F. BEACH
LOREN J. DELANTY
VICTOR VACQUIER
BY
ATTORNEY

June 3, 1952   F. D. BRADDON ET AL   2,598,672
MARINE GYRO VERTICAL

Filed Aug. 1, 1945   6 Sheets–Sheet 5

INVENTORS
FREDERICK D. BRADDON
LENNOX F. BEACH
LOREN J. DE LANTY
VICTOR VACQUIER
BY
ATTORNEY

June 3, 1952     F. D. BRADDON ET AL     2,598,672
MARINE GYRO VERTICAL
Filed Aug. 1, 1945     6 Sheets-Sheet 6
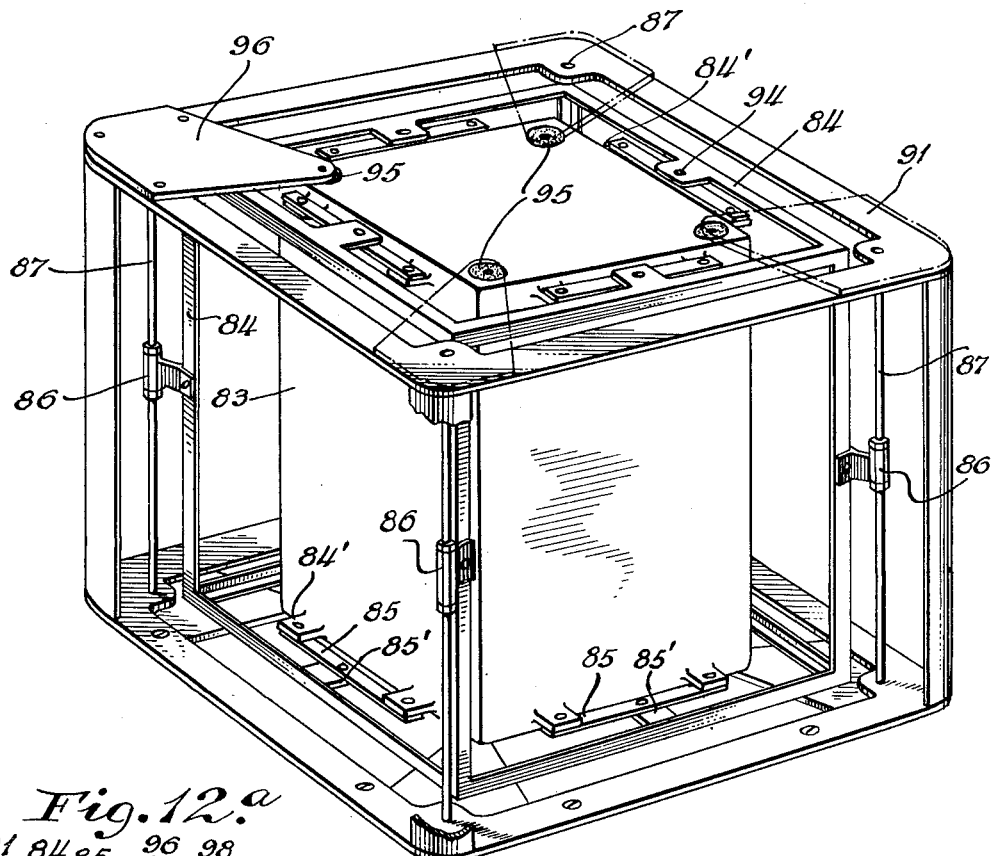
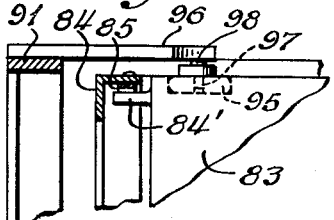
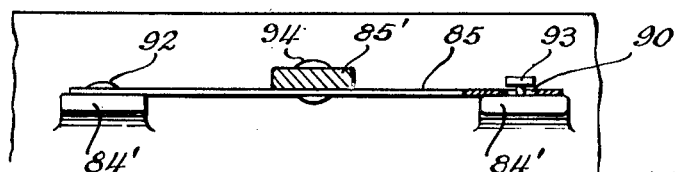
INVENTORS
FREDERICK D. BRADDON
LENNOX F. BEACH
LOREN J. DELANTY
VICTOR VACQUIER
BY their ATTORNEY.

Patented June 3, 1952

2,598,672

UNITED STATES PATENT OFFICE 2,598,672

MARINE GYRO VERTICAL

Frederick D. Braddon, Babylon, Lennox F. Beach, Port Washington, Loren J. Delanty, Baldwin, and Victor Vacquier, Garden City, N. Y., assignors to The Sperry Corporation, a corporation of Delaware Application August 1, 1945, Serial No. 608,140

9 Claims. (Cl. 74—5.47)

This invention relates to gyroscopic indicators of the vertical for use on board a ship or other moving vehicle to indicate the zenith and provide a datum from which roll or pitch of the ship can be measured and by which corrections for such roll and pitch can be introduced in setting guns or sights or similar directional instruments. The invention comprises also means for automatically and accurately transmitting roll and pitch angles to distant stations in the ship.

Any simple device such as a plumb-bob or spirit level which relies on gravity for finding the vertical is liable to gross errors in a moving ship because any horizontal acceleration of the ship itself is compounded with the true vertical acceleration due to the earth's mass (gravity) and produces an apparent or false vertical. It has hitherto been proposed to overcome this difficulty by using a gyroscope which would move very slowly toward the apparent vertical and which, therefore, would be only slightly disturbed by short-lived accelerations of the ship caused by rolling, pitching or change of speed or course. In order to minimize the effects of these artificial accelerations still further, it has been the practice to contrive the gravitationally responsive member as a separate organ from the gyroscope and to render said gravitational member inoperative to affect the gyroscope while changes are being made in the course or speed of the ship. In some cases, however, particularly in war ships, it is often necessary to change course or speed continuously over long periods to minimize the danger of enemy action, and if the gravitational element is put out of action for such long periods, the gyroscope is liable to wander by a substantial amount from its true vertical position. For this reason, in our invention, we maintain the gravitation-responsive means continually in action and introduce the proper calculated corrections for changes of course and/or speed, so as to hold the gyro axle in the true vertical at all times.

Other features and advantages will become apparent from the following description, taken in connection with the accompanying drawings wherein:

Fig. 11 is a perspective view of an improved shock mounting for the gyro-vertical;

Fig. 12 is a detail of one of the spring supports for the same; and

Fig. 12a is a sectional detail of the resilient connectors used at all corners of the mounting.

Figure 1:
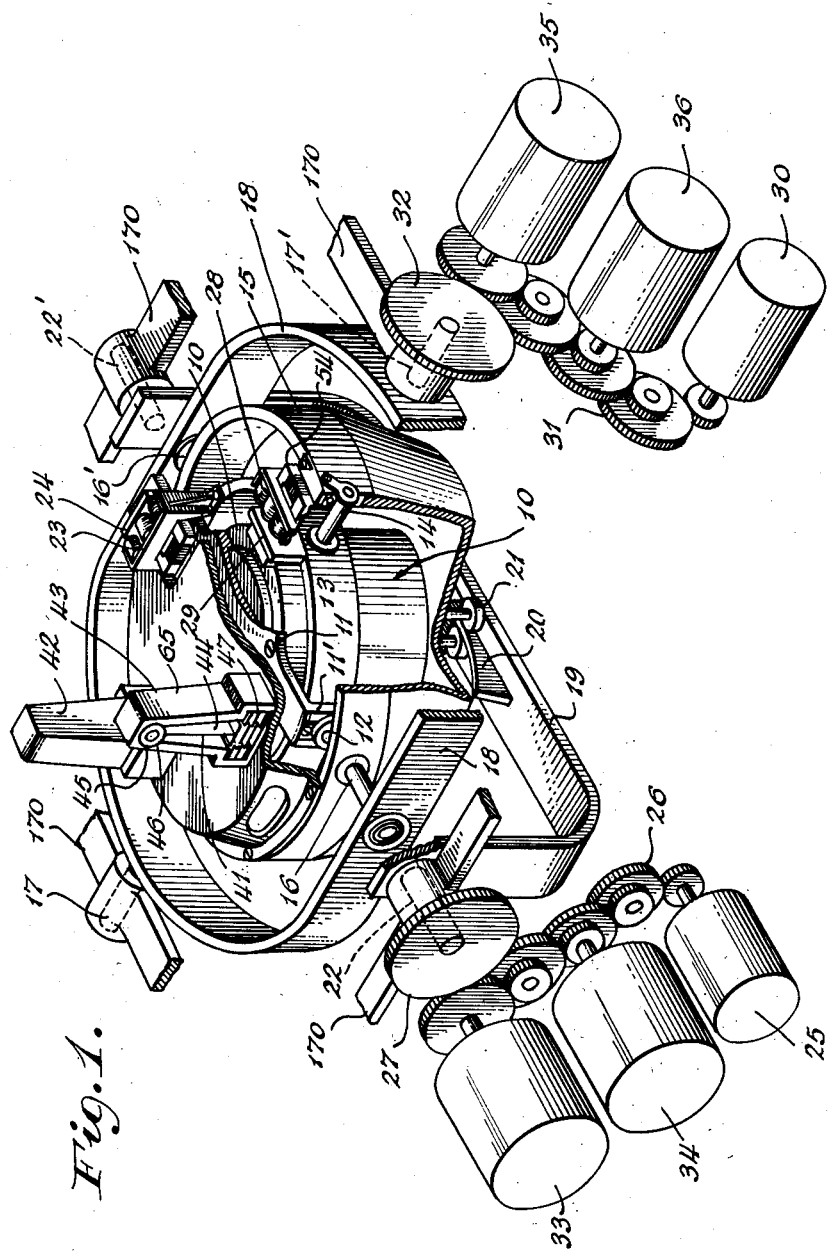
Fig. 1 is a perspective view, partly in section and partly diagrammatic, of our improved gyro-vertical.
Figure 2:
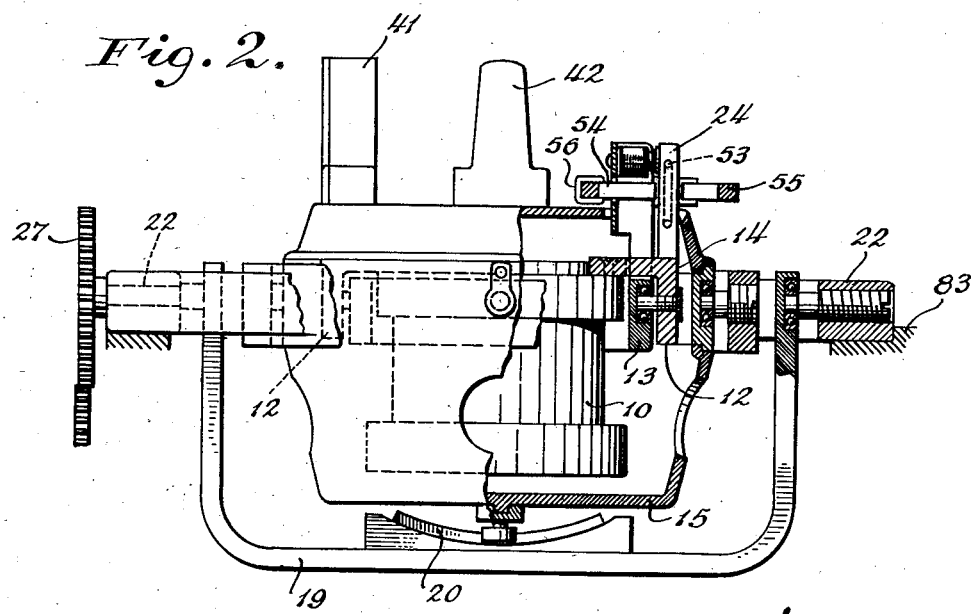
Fig. 2 is a side elevation of the same, partly in section.

Referring to Fig. 1, the gyroscope includes a rotor casing 10 within which the rotor or fly wheel (not shown) is journaled on a normally vertical axis, said rotor being maintained at a high speed of rotation on ball bearings in said casing by means of a built-in electric motor, in the usual manner. We prefer to seal the casing 10 hermetically and surround the gyro itself with an atmosphere of hydrogen or helium at low pressure so as to reduce the energy loss due to friction and at the same time to facilitate the transfer of heat to the casing. Helium is preferred because it is noninflammable.

The gyro casing 10 is carried by an upper plate 11 having downwardly projecting lugs 11' which are supported by ball bearings at 12 in gimbal ring 13. Gimbal ring 13 normally has its plane horizontal and the pivots 12 are disposed on an axis parallel with the fore and aft line of the ship, said axis hereinafter being referred to as the roll axis. Gimbal ring 13 is similarly mounted for rotation about an axis 14 in a phantom ring 15, said phantom ring in turn being supported in a main gimbal ring 18 by pivots 16, 16', normally collinear with the bearings 12, which support the gyro casing 10 in the gyro gimbal ring 13.

The main gimbal ring 18 lies normally with its plane horizontal, being supported by pivots 17, 17' in a frame 170 (not shown completely in this figure) which is attached to the ship and rolls or pitches with it. The axis of the pivots 17, 17' lies athwartships and is, therefore, horizontal when the ship is on an even keel.

A bail 19 is similarly supported in the main frame by pivots 22, 22' and hangs underneath the gyroscope. The axis of the pivots 22, 22' coincides with the roll axis and lies in the fore and aft direction in the ship. The bail 19 carries a track 20 which runs between two guide rollers 21 carried by the phantom element 15, and it will be seen that this arrangement allows the phantom element to turn round the pitch axis 17, 17' without involving any movement of the bail itself, but when the bail turns round the roll axis 22, 22', it imparts a similar movement through the rollers 21 to the phantom element 15.

The phantom ring 15 is made to follow up the gyro gimbal ring by means of two servomotors 25 and 30. Servomotor 25 deals with rolling movements and drives through a train of gears 26 to the pinion 27 which is connected to the bail 19 through trunnion 22. Similarly, the servomotor 30 drives through a train of gears 31 to gear 32 on pivot 17' of the main gimbal. These servomotors are controlled by any suitable pick-off such as the E-type inductive transformers which are well known in the art. Transformer 23 is carried on gyro gimbal ring 13 and cooperates with an armature 24 carried on gyro plate 11 to send a signal through suitable amplifying means (not shown) to the servomotor 25 whenever the gyro gimbal 13 is displaced from the gyroscope round the roll axis 22, 22'. Similarly, another follow-up transformer 28 carried on phantom ring 15 cooperates with an armature 29 carried by the gyro gimbal ring 13 so as to control the pitch servomotor 30 which through gear train 31 drives the wheel 32 on the pivot 17 of the pitch axis of the main gimbal ring 18. By virtue of these arrangements, the phantom ring 15 is made to keep its plane at all times parallel to the plane of the gyro casing 10 or the gyro plate 11.

The two sets of gears 26 and 31 by which the servomotors operate the follow-up support, may also be utilized to drive transmitters of the coarse and fine self-synchronous type for transmitting the vertical to a distance. Preferably, transmitter 33 transmits roll, that is to say the angle made by the plane of the gyro plate 11 and the pitch axis 17, 17' where they intersect on roll axis 22, 22'. The gear ratio is such that the transmitter makes a rotation of two degrees for every degree of roll. Similarly, the roll transmitter 34 transmits thirty-six degrees for each one degree of actual roll. In the same way the transmitters 35 and 36 transmit pitch with a two-to-one and a thirty-six-to-one ratio, respectively. The angle of pitch so transmitted is the angle between the roll axis 22, 22' and the plane of the gyro gimbal 13.

Figure 5:
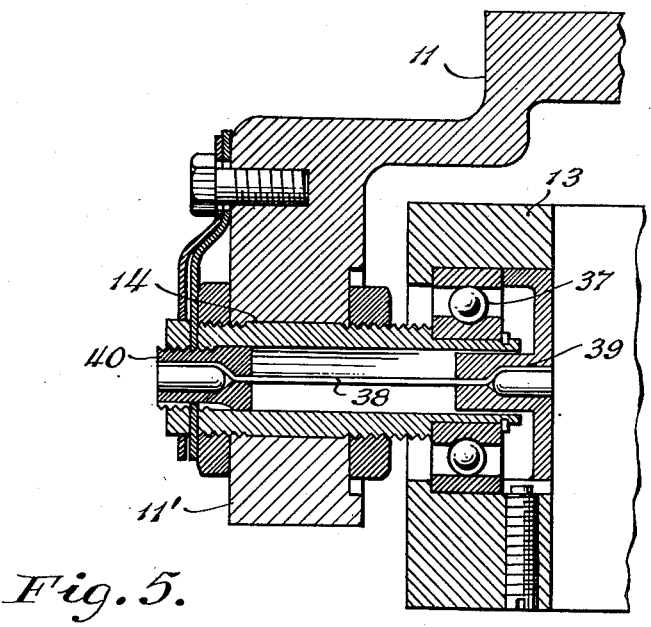
Fig. 5 is an enlarged sectional detail of one of the gimbal bearings.

As it is very important that the center of gravity of the whole gyro system should remain constantly fixed at the intersection of the orthogonal gimbal axes 16, 16', 17, 17', and as it is also necessary that all the gimbal bearings should be as frictionless as possible, special means of end or axial location are introduced. Thus, the trunnion 14 of gyro gimbal 13, which is shown to a larger scale and in more detail in Fig. 5, is made hollow and is screwed into plate 11, as shown, while its inner end is journaled in a ball bearing 37 carried in the phantom ring 13. A wire filament 38 is secured at one end to a plug 40 at the base end of the pivot, and at the other end to a tension plate 39 on the outside of the phantom ring. A similar arrangement is preferably used at the other end of the diameter of ring 15.

With this construction, at least one race of each ball bearing 37 is made truly cylindrical, the outer race being shown so in Fig. 5, instead of making both races somewhat concave as is the usual practice. By this construction, no end thrust is taken by the ball bearing under any circumstances, all end thrust being taken by the two wires 38, one at each side. Thus, expansion and contraction of the rotor and its casing during temperature changes cannot possibly cause binding of the bearings or a shift of the center of gravity of the system with respect to its center of support.

It will be appreciated that if the two filaments 38 are adequately tensioned, they will provide end location along the pitch axis for the gyro casing. The filaments necessarily apply a slight torsional constraint when the gyro casing 10 and the gyro gimbal 13 are not coplanar, but the servomotor system under the control of the inductive pick-off keeps these two rings substantially in the same plane at all times, so the torsional constraint is eliminated. The bearings at 12, 12' between the gyro plate 11 and the gyro gimbal 13 preferably are arranged each with a torsional filament in like manner.

In the foregoing description, it has been explained how the gyroscope is mounted so as to be practically free from disturbing couples; and how the phantom element 15 is constrained by the servomotors to follow the plane of the gyro at all times; and how movements of the ship in roll and pitch relatively to said phantom element can be electrically transmitted through the self-synchronous transmitters 33, 34, 35, 36 to all parts of the ship. It now remains to be explained how the gyroscope in its casing 10 is made to seek and retain a position in which its axle is truly vertical.

Figure 3:
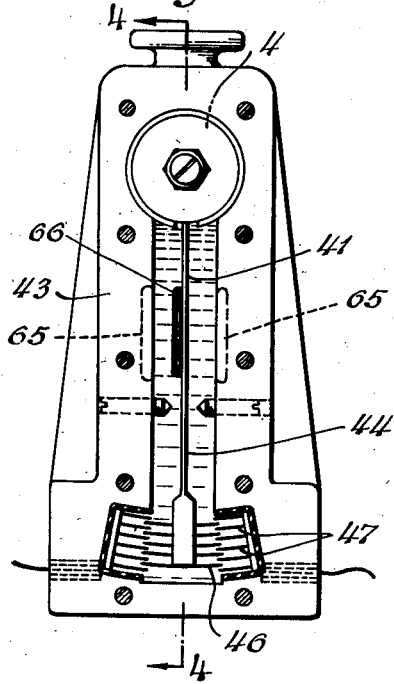
Fig. 3 is a vertical section of the pendulous controller employed on the gyro-vertical.
Figure 4:
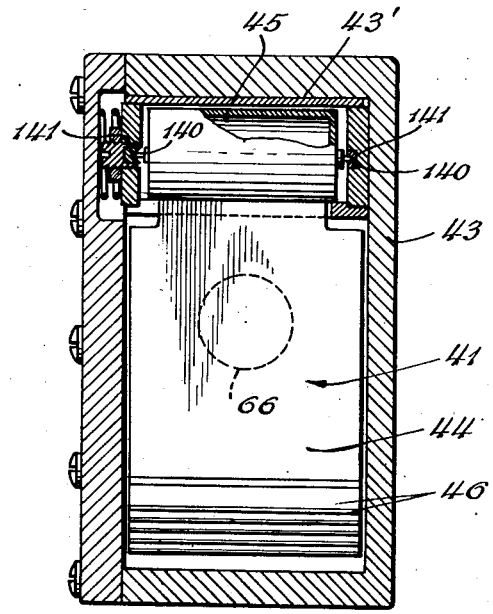
Fig. 4 is a vertical section of the same taken on line 4—4 of Fig. 3.

The gyroscope itself is mounted in neutral equilibrium and, therefore, is not directly acted on by gravity or any other acceleration. It is, however, controlled indirectly by two gravitationally responsive elements which consist of highly damped pendulums carried on the phantom ring 15. One of these pendulums 41 is arranged to respond to displacements relatively to the vertical round the roll axis while the other pendulum 42 is similarly responsive to pitch. Both pendulums may be of the same construction and one will now be described in detail, having reference to Figs. 3 and 4. Roll pendulum 41 is contained in a sealed container 43 which is shown with its front removed in Fig. 1, said container being normally full of liquid. The pendulum rod 44 is located by steel pivots 140 working in jewelled bearings 141, and its weight is supported by a cylindrical float 45 in a cylindrical chamber 43' in the container 43. Said float and chamber form a "capacity slip-ring" by which a high frequency supply can be fed from the casing through the dielectric liquid to the pendulum and its condenser plates 46 carried at its lower end, which move from side to side with the pendulum rod and cooperate with fixed plates 47 built into but insulated from the container 43. Plates 46 on the pendulum and the two sets of fixed plates in the container constitute a differential capacity in which the liquid filling the container forms the dielectric. At the same time, the liquid acts as a mechanical damping means for the pendulums and relieves the jewelled pivots of the weight of the pendulum by buoying up the float 45. Displacement of the phantom ring relatively to the pendulum is measured by a radio frequency capacitor bridge pick-off circuit, as shown in the wiring diagram of Fig. 7, the signal from which is used after amplification and rectification at 154 to apply to the gyroscope a couple causing it to precess and bring its axle parallel to the pendulum. The couples are produced as described hereinafter about the roll and pitch axes, respectively, for the pendulums which swing about the pitch and roll axes. The normal rate of precession produced by these means is very slow and the gyro, therefore, reproduces the mean positions of the two pendulums if the latter should oscillate.

Figure 6:
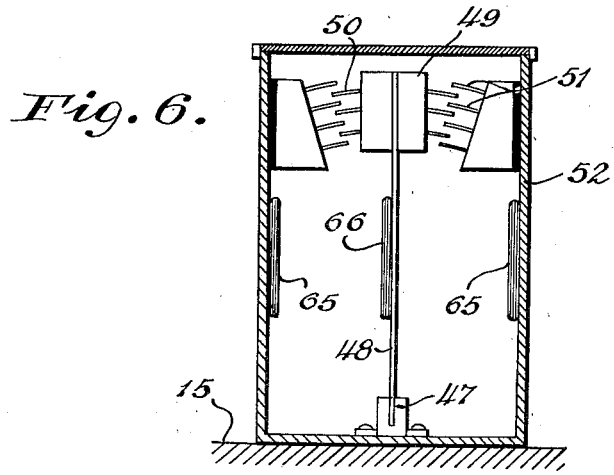
Fig. 6 is a vertical section of a modified form of pendulous controller for the gyroscope.

In place of the pendulum as above described, we may use alternatively a gravitationally responsive reed or inverted pendulum as shown in Fig. 6. In this figure the reed itself is shown at 48 and consists of a narrow strip of steel ribbon or a similar elastic member, with the lower end set firmly in a base 47 and the upper end carrying a mass 49. Since the spring 48 is a conductor it may conveniently serve as a lead in for coil 66 or for condenser plates 50. The whole is enclosed in a casing 52 filled with liquid of suitable viscosity which does not conduct electricity. The casing 52 is fixed on the phantom ring 15 in lieu of casing 43. The stiffness of the reed 48 is so proportioned to the mass 49 that so long as casing 52 is level, the reed will stand vertically upright. If the casing 52 is inclined to right or left, the base of the reed is inclined with it and the mass 49 bends the reed through an angle which is preferably greater than the angle of tilt of the casing 52. In other words, this type of inverted pendulum or reed magnifies the inclination of the casing which supports it, and hence furnishes a very sensitive tilt detector.

The mass 49 carries on either side a series of plates 50 which move with the mass and cooperate with a series of fixed plates 51 carried by but insulated from the casing, thus forming a variable condenser similar to that previously described with reference to the pendulum 41 and used in the same manner with a radio frequency capacitor bridge pick-off circuit to apply a couple to the gyroscope and cause it to precess and bring its axle back to the vertical position under which condition the reed 48 will again be restored to the vertical because of the operation of the follow-up control of phantom element 15 which carries the casing 52.

It will now be clear that the phantom ring 15 is constrained to maintain its plane parallel to that of the gyroscope by the roll and pitch servo-motors 25 and 30 operating under the control of the E-type follow-up transformers 28 and 23. Consequently, if the gyro axle is not vertical the plane of the phantom ring will not be horizontal and the controlling pendulums or reeds, through their respective amplifiers, will apply couples around the roll and pitch axes as requisite to bring the gyro axle vertical, and therefore the phantom plane horizontal.

Figure 8:
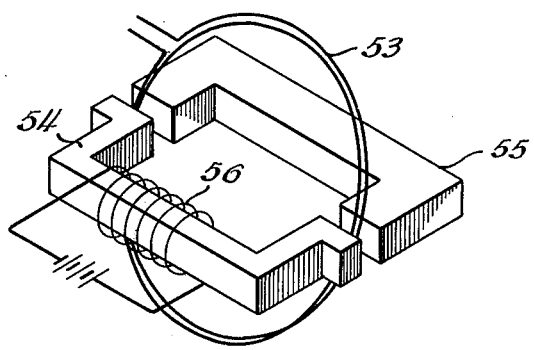
Fig. 8 is a perspective diagrammatic view of one of the torquers used to apply torques on the gyroscope.

It is important that the couple which causes the precession should be a linear function of the control signal and exert no couple on the gyro when there is no control signal. To obtain this result, it is desirable to avoid the use of any iron in the moving part and we have, therefore, invented an improved type of torque producing element or torquer which is shown in Fig. 8. This consists of a coil of insulated copper wire 53 carried by the gyro and fed with the direct-current control signal from the pendulum. This coil is free to move in a magnetic field produced between the poles of a magnet 54 (which may be electromagnetic or permanent) and soft iron part 55. These parts which form the magnetic circuit are carried by the phantom ring 13, and the electromagnet 54 is energized by any convenient source of D. C. supply which excites the winding 56. The couple which the coil 53 applies to the gyro is then proportional to the strength of the current passing through said coil considering the strength of the field of electromagnet 54 which links with it, as of fixed value.

It will be understood that the current in the winding 53 is a direct current of one direction or the other which is derived from the differential A. C. signal transmitted through a phase sensitive rectifier 154 of known type and through the appropriate pendulum condenser plate system. The pitch correction couple is applied to the gyroscope from the gyro gimbal and the roll correction couple is applied to the gyro gimbal from the phantom.

Figure 9:
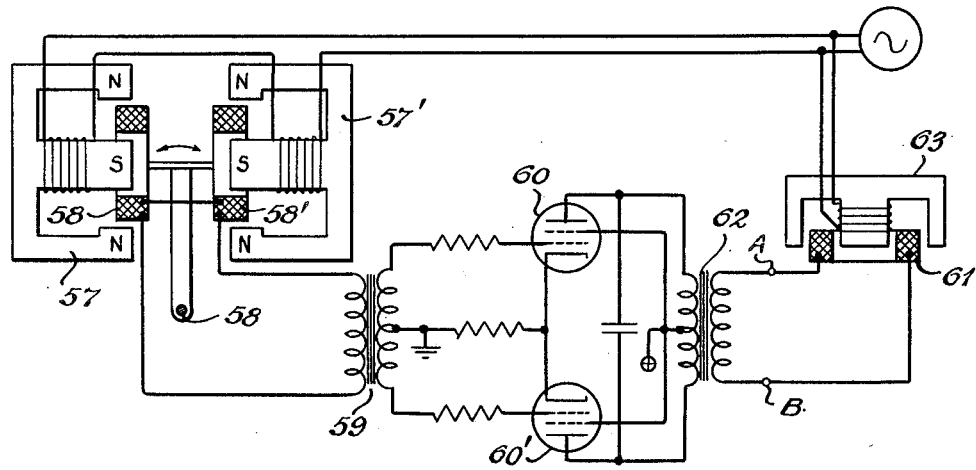
Fig. 9 is a wiring diagram showing an alternative alternating current form of torquer and how it may be controlled from an alternating current controller.

Alternatively, Fig. 9 shows a control circuit using alternating current torquers instead of direct current torquers. This employs a torque-free 400 cycle magnetic bridge circuit.

Figure 10:
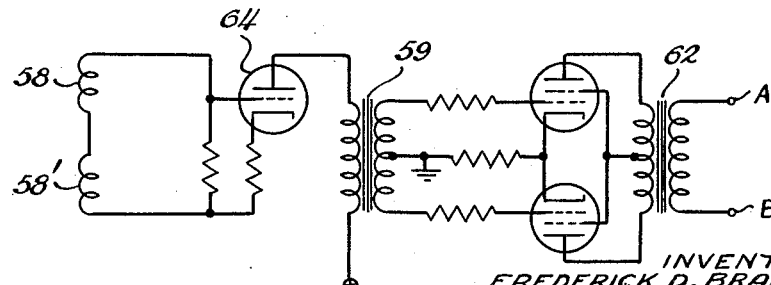
Fig. 10 is a wiring diagram showing a further modification of the circuit of Fig. 9.

The two cores 57, 57' are energized with A. C. and comprise the stator of the pick-off. The moving element pivoted at 58, which is, for example, the roll axis 22, carries two coils 58 and 58' which are connected in series opposition to the primary of the transformer 59. The secondary of this transformer feeds the grids of a pair of vacuum tubes 60 and 60' which operate in push-pull and excite coil 61 through transformer 62, coil 61 being carried by the gyroscope in the magnetic field of electromagnet 63 which is carried on the gimbal ring. This electromagnet is energized from the same supply as is used for the pick-off magnets 57 and 57'. The phase of the current in the coil 61 reverses depending on whether the moving element carrying the coils 58, 58' moves to the right or to the left of the neutral position. The vacuum tubes 60, 60' are biased so as to draw no grid current. The only coercive force on the moving element is the one that arises from the core excitation of transformer 59 which is practically negligible. However, in cases where this force might be considered objectionable, the difficulty may be overcome by inserting a triode 64 as shown in the circuit of Fig. 10, so that a weaker primary signal may suffice with amplification to operate transformer 59 as before.

In apparatus as described above, various deviations may result from accelerations of the ship or other vessel which carries it, and unless the apparatus is used at the north or south pole, there would be a further deviation because the local vertical is not a line which is fixed in space, but a line which rotates with the earth and the gyroscope must be continually precessing if it is to remain in that vertical.

Deviations due to roll and pitch of the ship are effectively suppressed by the arrangements already described. While these movements of the ship will impress a forced oscillation on the control pendulums 41 and 42 the effect of these oscillations on the gyroscope will be greatly attenuated for the following reasons: Firstly, the heavy damping of the pendulum due to the liquid in the casing which surrounds it integrates the acceleration forces, so that any resultant forced oscillation of the pendulum is of a very small amplitude; secondly, the couples applied to the gyroscope by the torque elements 53 and 54 will be very small and the rate of precession of the gyroscope both on that account and on account of its long period will be minute so that although the oscillation of the pendulum due to the roll of the ship will tend to produce an oscillation of the gyroscope spin axis, the amplitude of this latter oscillation will be so very small as to be quite negligible, being in effect twice integrated.

In the case of horizontal accelerations due to changes in course, the acceleration may persist for a considerable time and if not prevented, may build up a finite displacement of the gyro axle from the true vertical. According to our invention, we control the error at its source by holding the roll pendulum, during changes of course, in the true vertical position making an angle with the false vertical proportional to the speed of the ship and the rate of turn in a manner described hereinafter with reference to Figs. 3, 4 and 7.

Changes in the speed of the ship occurring either with or without simultaneous changes of course are another type of acceleration, the effects of which must be prevented from reaching the gyroscope, and these are dealt with preferably the same way by applying couples to the pitch pendulum proportional to said acceleration so as to hold said pendulum out of the false vertical in which it would naturally hang and in the true vertical which the gyroscope is desired to maintain.

Figure 7:
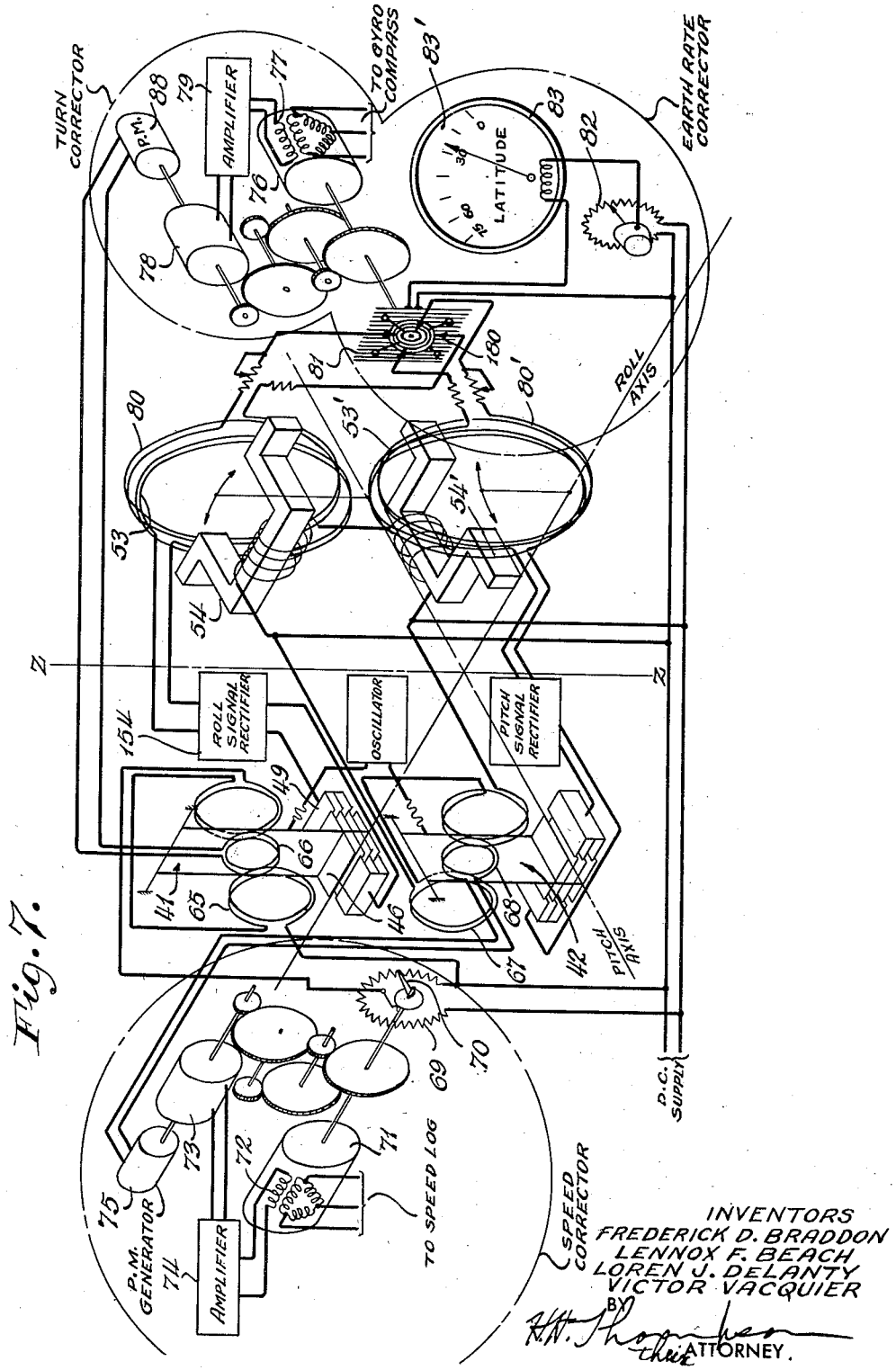
Fig. 7 is a wiring diagram and schematic view of our invention.

For these purposes, the roll pendulum 41 is provided with a pair of coils 65, 66, as shown in Figs. 3, 4, 6 and 7; coil 65 being mounted on the inside of the casing 53, and coil 66 being carried by the pendulum itself. Similarly, the pitch pendulum 42 has coil 67 secured to its casing and 68 carried by the pitch pendulum. Coil 65 is fed with direct current of an amount proportional to the instantaneous speed of the ship by means such as shown in Fig. 7. In this figure, 69 is a potentiometer, the extremities of which are connected across the direct current supply and this is connected so that the current in coil 65 depends upon the position of the slider 70. Said slider is moved according to the ship's speed from some form of speed indicating log. The log drives a self-synchronous transmitter of the usual kind (not shown) which is electrically connected to selsyn signal generator 71. The secondary winding 72 controls the reversible motor 73 through phase sensitive rectifier 74. The motor 73 also drives permanent magnet (D. C.) generator 75 and, through gearing, the rotor of synchro unit 71; the shaft of which carries the potentiometer slider 70. The angle through which said slider has been rotated, therefore, reproduces the angular position of the ship's speed indicator and the current in the coil 65 is also proportional to said speed.

Coil 66, carried by the roll pendulum, is fed with direct current of strength proportional to the ship's rate of turn. This signal may be derived as follows. The angle of the ship's head is transmitted by the ship's gyro compass (not shown) to a repeater selsyn signal generator 76, the secondary winding of which 77 drives reversible motor 78 through amplifier 79 at a rate proportional to the rate of change of the ship's head as given by the gyro compass. Said motor 78 drives permanent magnet direct current generator 88, which gives a voltage proportional to the rate of change of course and this voltage is applied to energize coil 66 with a corresponding current. Coils 65 and 66 on the pendulum case and pendulum, respectively, are arranged like wattmeter coils and exert a couple on one another proportional to the products of their currents, and therefore, proportional to the speed of the ship derived from potentiometer 70 multiplied by the rate of turn of the ship derived from generator 88. The number of turns and positions of these coils are chosen so that the couple they produce will be exactly sufficient to maintain the roll pendulum in the true vertical in spite of the acceleration caused by the turning of the ship, which acceleration force F, as is well known, is proportional to the rate of turn in radians per second ($\omega$) multiplied by the linear velocity (S) ($F \alpha \omega S$). Preferably no iron cores are used, to retain linear relation between torque and current strength substantially unaffected by relative coil positions within the range of movement utilized. By using no iron, residual magnetic effects are also avoided.

The pitch pendulum is affected directly by changes in the linear velocity (S). Motor 73, as already described, runs to position slider 70 according to the ship's velocity; the permanent magnet generator 75 coupled to said motor, therefore generates a voltage proportional to the rate of change of said velocity, i. e., to linear acceleration, and this voltage is applied to coil 68 on the pitch pendulum as shown in Fig. 7. In this case the fixed coil 67 does not need to be a variable and may be fed directly from the D. C. supply, so that the couple on the pitch pendulum due to the interaction between coils 67 and 68 is proportional to the rate of change of speed alone.

The manner of causing the axle of the gyroscope to follow the local vertical as the earth rotates will now be described. At the equator, the vertical is constantly tilting over towards the east at a rate of 15° an hour and if the gyro axle is to remain in this vertical it must necessarily precess at the same rate and in the same direction from west to east. In other latitudes, the rate of tilting of the vertical and therefore the rate of precession required of the gyroscope will be 15° per hour multiplied by the cosine of the latitude. Since the direction of precession is always from west to east, the couple applied to the gyro to cause the precession must be around a horizontal axis lying east and west. As the ship changes course, said couple must be applied sometimes around the roll axis when the course is east or west or around the pitch axis when the course is north or south, or around both axes on intercardinal courses. This may be stated generally by saying that the couple round the roll axis must be proportional to cosine of the latitude multiplied by the sine of the course while the couple round the pitch axis must be proportional to the cosine of the latitude times the cosine of the course.

One form of mechanism by which these couples may be developed may be seen in Fig. 7. In addition to coils 53 and 53' already described, the gyro carries another coil 80 on the pitch axis adjacent coil 53 and another coil 80' on the roll axis adjacent coil 53'. The coils 80 and 80' are to apply couples to correct for the earth's rotation. These coils are fed from a sine-cosine function potentiometer 81 having sliders which are driven by the shaft of the gyrocompass repeater system 76. The terminals of the coils 80 and 80' are connected to points 90° apart around the potentiometer and since the potentiometer is supplied with current through the sliders 180, coil 80 receives a voltage proportional to the cosine of the course while coil 80' receives a voltage proportional to the sine of the course. The excitation of potentiometer 81 is derived from the main direct current supply through a potentiometer 82 which is adjusted by hand until the current in the ammeter 83 is proportional to the cosine of the latitude. This may be done by graduating scale 83' thereof according to a cosine function of latitude. The absolute value of the voltage supplied to potentiometer 81 is so chosen with regard to the angular momentum of the gyro that the rate of precession it produces will have exactly the required value to keep up with the earth's rotation, which of course is known with mathematical certainty.

In order to obtain the greatest possible accuracy of the apparatus of this nature, it is highly desirable that it should be insulated from mechanical shocks such as may be caused by rough seas, concussion of gun fire, etc. With an apparatus of this type, it does not suffice merely to mount the apparatus on a resilient support such as rubber or springs, because the instrument as a whole would be free to make angular motions relatively to the ship which would adversely affect its transmitted indications. We have, therefore, devised a special form of mounting which, while allowing three degrees of limited, damped translational freedom, prevents all angular freedom about horizontal axes. The principle of this mounting and the manner of its construction may be understood from Figs. 11, 12 and 12a. The gyro vertical proper with all the apparatus hitherto described, may be mounted in a case or container 83, which is carried in a cradle or open cage 84 built up of angle bars or other rigid structure capable of carrying the weight of the apparatus.

Casing 83 is suspended within cradle 84 by a multiple spring suspension resembling a system of parallel linkages, which gives limited freedom vertically and shock-mounts the case against vertical vibrations but prevents any relative tilting of the case with respect to the cradle. For this purpose we have shown four leaf springs 85 at both the top and bottom of the case, each connected at one end to lug 84' on the case as by rivet or other fastening 92 and at a spaced point to lug 85' on the cradle by a second rivet 94. If desired, each spring may be extended beyond the rivet 94 and slidably anchored at the free end to the case by a pin 93 passing through a slot 90 in the spring.

Similarly, cradle 84 is suspended from the outer support or open frame 91 by the equivalent parallel linkage system comprising four thin resilient rods 87 secured at their tops to frame 91 and having a lower portion or mid portion passing through and secured to brackets 86 projecting from cradle 84. If desired, the rods may also extend downwardly and be anchored at the bottom of the frame 91. This construction absorbs lateral shocks by the bending of the rods 87; that is, shocks due to vibrations having a component in the horizontal plane, including both fore and aft and transverse vibrations, but will not permit relative tilting of the cradle with respect to the outer support 91.

Additonal shock-absorbing means may be provided for exceptional severe shocks in the form of four rubber cushions or buttons 95 positioned at the four upper corners of the case 83. Plates or brackets 96 riveted to the corners of the outer support 91 have a pin 97 projecting downwardly from each, which enters a hole in each button 95 and hence absorbs lateral oscillations. Said pin 97 also has a collar 98 fixed thereon, resting on top of the rubber button 95 so as to act to damp vertical vibrations. The buttons and brackets preferably also are reproduced on the bottom of the case 83 and frame 91. In this manner, the sensitive gyro instrument is shock-mounted against practically all forms of vibration, while at the same time relative tilt of the support about any horizontal axis is prevented.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A pendulous controller for controlling the application of erecting torques to a gyro vertical comprising an enclosing casing of conducting material, a reed or inverted pendulum consisting of an electrically conducting rod with its lower end resiliently attached to said casing and carrying at its upper end a plurality of vanes or plates of conducting material, a plurality of corresponding plates fixed inside said casing and insulated therefrom and forming, with the plates on the reed, a variable capacity, and a nonconducting viscous liquid in said container acting as a mechanical damper of the vibrations of the reed and also as the dielectric between the plates.

2. A gyroscopic device for ships and like craft comprising a gyroscope universally mounted to indicate the zenith, a power-driven follow-up element controlled to follow the apparent movements of the gyroscope around an axis fore and aft in the ship and to follow the movements of the gyroscope around an athwartship axis, transmitters of angle of roll and pitch of the ship geared to said element, a resiliently mounted inner framework containing said gyro, an intermediate frame and an outer housing, said inner framework being supported in said intermediate frame by a plurality of leaf springs so constructed as to have freedom of vertical translation by flexure of said springs but no freedom of rotation with respect to said intermediate frame, said intermediate frame being attached to said outer housing by a plurality of vertical rods anchored at top and bottom and having lugs near their midparts for the attachment of said intermediate frame so as to allow said frame freedom of horizontal translation in any direction but no freedom of angular movement round any horizontal axis whereby said gyroscopic device will transmit the true angles of roll and pitch in spite of the translational resilience given to the mounting to minimize the effects of shock.

3. Means for preventing deflection of a pendulum adapted to be mounted on a moving vehicle, comprising the combination of a pendulum movable about the fore and aft axis of the vehicle, a coil mounted on such pendulum, a second coil cooperating therewith moving with the vehicle, means for exciting one coil in accordance with the linear speed of the vehicle, and means for exciting the other coil in accordance with the rate of turn of the vehicle.

4. A gyro vertical for ships and like craft including a gyroscope, a support in which said gyroscope is universally mounted, a shock absorbing mounting for said support comprising a leaf spring linkage system for absorbing vertical vibrations to maintain parallelism between said support and ship, and a second leaf spring linkage system for absorbing lateral shocks from the ship to maintain parallelism between said support and the ship.

5. In a pendulous controller and the like, a metallic casing adapted to contain a non-conducting liquid and having a rounded cavity at the top, a pendulum suspended therein and having a hollow drum at its top within said cavity closely fitting but spaced from said cavity and adapted to support by floatation the weight of the pendulum, condenser plates on said pendulum, said drum also acting to transmit potentials between the case and said condenser plates and cooperating condenser plates within said casing and insulated therefrom.

6. In a pendulous controller for gyro verticals and the like, a metallic casing adapted to contain a non-conducting liquid and having a rounded cavity at the top, a pendulum suspended therein and having a hollow drum at its top within said cavity closely fitting but spaced from said cavity and adapted to support by floatation the weight of the pendulum, condenser plates extending from the pendulum, said drum also acting to transmit potentials from the case to said condenser plates, cooperating condenser plates extending within the casing but insulated therefrom, and conducting means for transferring signals generated in said cooperating condenser plates for control purposes.

7. In a pendulous controller for gyro verticals and the like, a metallic casing adapted to contain a non-conducting liquid and having a rounded cavity at the top, a pendulum suspended therein and having a hollow drum at its top within said cavity closely fitting but spaced from said cavity and adapted to support by floatation the weight of the pendulum, condenser plates extending from each side of the pendulum, said drum also acting to transmit potentials from the case to said condenser plates, cooperating condenser plates extending within the casing but insulated therefrom, and on each side of the pendulum, and conducting means for transferring signals generated in said cooperating condenser plates for control purposes.

8. In a gyro vertical having a rotor casing, a universally mounted phantom element stabilized by the gyro vertical, a gimbal mounting between said element and rotor casing providing mutually perpendicular, normally horizontal, inner and outer gimbal axes, and means for securing endwise location of the rotor casing relative to the phantom element, at each end of the inner gimbal axis comprising a filament having one extremity secured to the rotor casing and the other secured to the gimbal mounting, and at each end of the outer gimbal axis comprising a similar filament secured at one extremity to the gimbal mounting and at the other extremity to the phantom element, all said filaments being permanently in tension.

9. Means for preventing deflection of a pendulum adapted to be mounted on a moving vehicle, comprising the combination of a pendulum movable about the pitch axis of the vehicle, a coil mounted on such pendulum, a second coil cooperating therewith moving with the vehicle, means for constantly exciting one coil, and means for exciting the other coil in accordance with the acceleration of the vehicle along its fore and aft axis.

FREDERICK D. BRADDON.
LENNOX F. BEACH.
LOREN J. DELANTY.
VICTOR VACQUIER.

REFERENCES CITED

The following references are of record in the file of this patent:

UNITED STATES PATENTS

| Number | Name | Date |
|---|---|---|
| 1,501,886 | Abbot | July 15, 1924 |
| 1,797,913 | Henderson | Mar. 24, 1931 |
| 1,880,982 | Rawlings | Oct. 4, 1932 |
| 2,080,429 | McNally | May 18, 1937 |
| 2,252,338 | Alkan | Aug. 12, 1941 |
| 2,315,216 | Moller et al. | Mar. 30, 1943 |
| 2,334,002 | Heintz et al. | Nov. 9, 1943 |
| 2,368,644 | Curry | Feb. 6, 1945 |
| 2,390,532 | Haskins et al. | Dec. 11, 1945 |
| 2,409,178 | Allison et al. | Oct. 15, 1946 |
| 2,411,087 | Ford et al. | Nov. 12, 1946 |
| 2,419,063 | Fischer | Apr. 15, 1947 |
| 2,427,130 | Ford | Sept. 9, 1947 |
| 2,427,158 | Poitras et al. | Sept. 9, 1947 |